United States Patent
Hadi et al.

(10) Patent No.: US 8,117,110 B2
(45) Date of Patent: Feb. 14, 2012

(54) CONVERSION OF OVER-THE-COUNTER SWAPS TO STANDARDIZED FORWARD SWAPS

(75) Inventors: Muhammed Hadi, Chicago, IL (US); Dale Michaels, Westmont, IL (US); Amy Stephen, Chicago, IL (US); Ketan Patel, Hanover Park, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 612 days.

(21) Appl. No.: 11/965,530

(22) Filed: Dec. 27, 2007

(65) Prior Publication Data

US 2009/0171826 A1   Jul. 2, 2009

(51) Int. Cl.
*G06Q 40/00* (2006.01)
(52) U.S. Cl. .......................................................... 705/37
(58) Field of Classification Search ............... 705/35–37
See application file for complete search history.

(56) References Cited

U.S. PATENT DOCUMENTS

| | | | |
|---|---|---|---|
| 6,304,858 B1 | 10/2001 | Mosler et al. | |
| 6,317,727 B1 | 11/2001 | May | |
| 6,321,212 B1 | 11/2001 | Lange | |
| 6,347,307 B1 | 2/2002 | Sandhu et al. | |
| 6,421,653 B1 | 7/2002 | May | |
| 6,985,878 B1 | 1/2006 | Yamazaki et al. | |
| 6,996,540 B1 | 2/2006 | May | |
| 7,089,202 B1 | 8/2006 | McNamar et al. | |
| 7,225,153 B2 | 5/2007 | Lange | |
| 7,233,921 B2 | 6/2007 | Takeda et al. | |
| 7,246,094 B1 | 7/2007 | Butcher | |
| 7,333,950 B2 | 2/2008 | Shidler et al. | |
| 7,337,136 B1 | 2/2008 | Burns et al. | |
| 7,373,328 B1 | 5/2008 | Butcher, III | |
| 7,376,604 B1 | 5/2008 | Butcher | |
| 7,389,262 B1 | 6/2008 | Lange | |
| 7,395,232 B1 | 7/2008 | Pilato | |
| 7,467,112 B2 | 12/2008 | Frankel | |
| 7,930,238 B2 | 4/2011 | Frankel | |
| 2002/0107774 A1 | 8/2002 | Henninger et al. | |
| 2003/0135450 A1 | 7/2003 | Aguais et al. | |
| 2006/0143099 A1* | 6/2006 | Partlow et al. ................... | 705/35 |
| 2006/0224491 A1* | 10/2006 | Pinkava ........................... | 705/37 |
| 2006/0224492 A1* | 10/2006 | Pinkava ........................... | 705/37 |
| 2006/0224493 A1* | 10/2006 | Pinkava ........................... | 705/37 |
| 2006/0224494 A1* | 10/2006 | Pinkava ........................... | 705/37 |
| 2007/0011079 A1 | 1/2007 | May | |
| 2007/0055609 A1 | 3/2007 | Whitehurst | |
| 2007/0288351 A1* | 12/2007 | Huntley ........................... | 705/37 |
| 2008/0249958 A1 | 10/2008 | Anguish et al. | |

OTHER PUBLICATIONS

Anonymous, . REPORTS. (Nov. 2007). Banking & Financial Services Policy Report, 26(11), 25.*

(Continued)

*Primary Examiner* — Hani Kazimi
(74) *Attorney, Agent, or Firm* — Brinks Hofer Gilson & Lione (57) ABSTRACT

Systems, processes and methods are described for converting over-the-counter derivative products such as interest rate swaps (IRSs) to standardized forward swaps, such as centrally cleared interest rate swaps. The value of each leg of the over-the counter swap may be determined and compared to a value of a corresponding leg of the forward swap. A mark-to-market value may be determined as the difference between the values.

18 Claims, 4 Drawing Sheets

OTHER PUBLICATIONS

Martin de Sa'Pinto, Senior Financial Correspondent. "Credit Default Swaps Pace OTC Derivatives Growth." Daily News, Nov. 17, 2006, 1.*

"CBOT to Launch Credit Default Swap Index Futures Contracts; New Contract to Offer Transparency While Replicating Traditional OTC Trading Conventions." PR Newswire May 31, 2007.*

International Search Report mailed Feb. 18, 2009, for International Application No. PCT/US08/86976.

Written Opinion of the International Searching Authority mailed on Feb. 18, 2009, for International Application No. PCT/US08/86976.

International Preliminary Report on Patentability for PCT/US2008/086976, dated Jun. 29, 2010, 5 pages.

Nielsen and Ronn, "The Valuation of Default Risk in Corporate Bonds and Interest Rate Swaps," *The Wharton School*, Oct. 1994.

Duffie and Singleton, "An Econometric Model of the Term Structure of Interest-Rate Swap Yields," *The Journal of Finance*, vol. LII, No. 4, Sep. 1997.

Mark Grinblatt, "An Analytic Solution for Interest Rate Swap Spread," *UCLA Anderson Graduate School of Management*, Oct. 20, 1993.

Longstaff, F.A., et al., "Corporate Yield Spreads: Default Risk or Liquidity, New Evidence from the Credit Default Swap Market," *The Journal of Finance*, vol. 60, No. 5, pp. 2213-2253, Oct. 2005, http://www.princeton.edu/~bcf/Longstaffpaper.pdf.

International Search Report and Written Opinion of PCT/US2007/024904, mailed May 8, 2008.

* cited by examiner

CONVERSION OF OVER-THE-COUNTER SWAPS TO STANDARDIZED FORWARD SWAPS

CROSS-REFERENCE TO RELATED APPLICATIONS

This patent is related to co-pending U.S. patent application Ser. No. 11/950,117, filed on Dec. 4, 2007, titled "FACTORIZATION OF INTEREST RATE SWAP VARIATION", the content of which is incorporated in its entirety herein by reference for all purposes.

TECHNICAL FIELD

This patent generally relates to systems and processes for the administration of financial instruments, and more specifically to conversion of over-the-counter swap positions to centrally cleared swap positions.

BACKGROUND

Over-the-counter (OTC) financial products include financial instruments and investment vehicles that are bought, sold, traded, exchanged, and/or swapped between counterparties. After an exchange of an OTC financial product, the parties may expend resources managing the product for the duration of its life. Management may be complicated based on the number of exchanges and/or the specific terms of the contract.

Interest rate swaps (IRS) are examples of financial products that are traditionally exchanged, traded or otherwise bought and sold in an OTC market. The IRS is a financial product or investment vehicle where the parties agree to exchange streams of future interest payments based on a specified principal or notional amount. Each stream is typically referred to as a leg.

An example of an IRS is a plain fixed-to-floating, or "vanilla," interest rate swap. The vanilla swap includes an exchange of two streams of payments, where one stream is based on a floating or variable interest rate and the other is based on a fixed interest rate. The variable interest rate may be linked to a periodically known or agreed upon rate for the term of the swap, such as the London Interbank Offered Rate (LIBOR). The variable rate may be based on other agreed upon factors such as a reference rate, the total return of a swap, an economic statistic, etc. Other examples of swaps include total return swaps, and Equity Swaps.

The expiration or maturity of the streams of payments may occur well into the future. A book of existing and new IRS may include multiple IRS having a variety of maturity dates. In the OTC market, the parties to an IRS, such as banks and intermediaries, each bear the risk and expense of carrying the IRS over the lifetime of the swap. Typically, a party may reverse the IRS only by renegotiating the IRS with the counterparty. Older IRS's that may be on the books may be obsolete and add "noise" to a party's balance sheet.

It would be desirable to provide processes and methods for converting or netting outdated swaps.

SUMMARY

Systems and methods for converting open positions for over-the-counter swaps to standardized forward interest rate swaps (IRS), such as centrally cleared swaps, are disclosed. The disclosed systems and processes are not limited to open positions derived or resulting from IRS transactions or any particular over-the-counter financial instruments. Instead, the systems and processes may be generally applied to any negotiable financial instruments and investment vehicles. In one exemplary embodiment, innovations for converting IRS positions to centrally cleared IRS products are disclosed.

In one embodiment, a method of converting an over-the-counter swap associated with a fixed rate and a floating rate to a forward swap is disclosed. The method includes determining a spot rate estimate between a spot rate associated with an over-the-counter swap and a spot rate associated with a forward swap, determining a spot payout based on the spot rate estimate and a notional amount, calculating a market value associated with the over-the-counter swap payments, calculating a market value based on the spot rate estimate, calculating a market value based on a fixed rate, and determining a cash flow difference between the market value based on the spot rate estimate and the market value based on a fixed rate.

In another embodiment, a method of converting an over-the-counter swap having a fixed rate leg and a floating rate leg to a forward swap is disclosed. The method includes (a) determining a notional value of a coupon to be received on an agreed-upon start date for an over-the-counter swap and discounting the notional value of the coupon to a spot date, (b) determining a cash flow as a difference between the fixed rate leg and the floating rate leg applied from a last coupon date to the next spot coupon agreed-upon date, (c) calculating a market value of the fixed leg for payments, (d) calculating the market value of a desired forward fixed or floating leg discounted back to today. The method further includes calculating a mark-to-market for converting this over-the-counter spot swap to an equivalent a forward swap according to the market value of the coupon determined in (a) the market value of the remaining coupons on the fixed leg in (c) and the market value of the desired floating leg (d).

The details of these and other embodiments of the present invention are set forth in the accompanying drawings and the description below. Other embodiments are disclosed, and each of the embodiments can be used alone or together in combination. Additional features and advantages of the disclosed embodiments are described in, and will be apparent from, the following description and figures.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Figure 1:
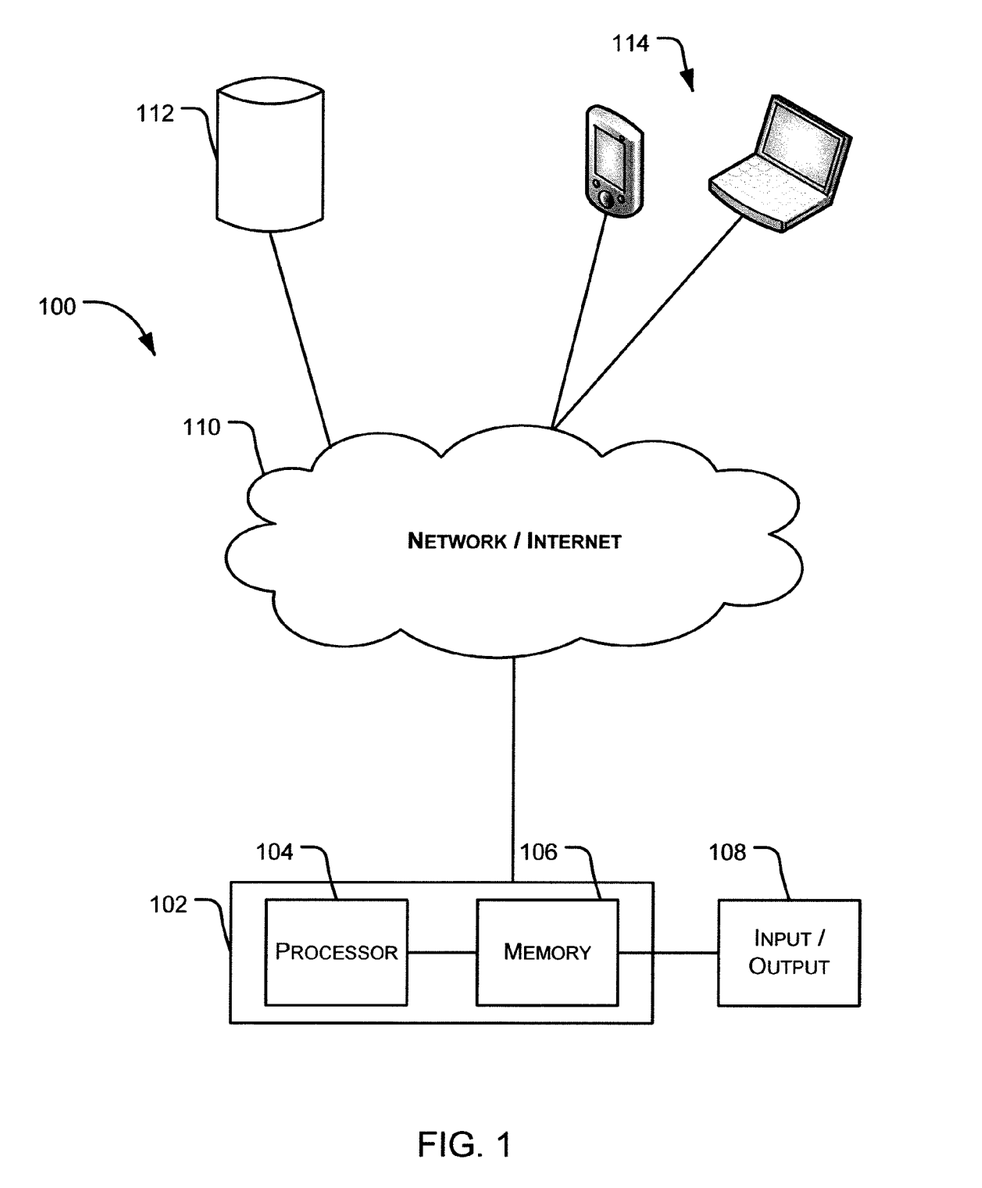
FIG. 1 illustrates a computer network system that may be used to implement aspects of the disclosure.

An example of a suitable operating environment 100 in which various aspects of the invention may be implemented is shown in FIG. 1. The operating environment 100 is only one example of a suitable operating environment and is not intended to suggest any limitation as to the scope of use or functionality of the invention. A computer system 102 may be configured for operation within the operating environment 100. The computer system 100 may include a processor or processing unit 104 and a memory or memory unit 106. The memory or memory unit 106 may be configured to store computer-executable instructions in accordance with aspects of the invention. The computer-executable instructions may, in turn, be executed by the processor or processing unit 104. The computer-executable instructions may be comprised of modules in accordance with aspects of the invention.

The computer system 102 may be in communication with one or more input/output (I/O) devices 108. The I/O devices 108 may be, for example, a keyboard, a mouse, voice automation, a screen or display, a kiosk, a handheld computing device display, a microphone, etc. The computer system 102 may be configured for communication with a network 110. The network 110 may be a secure virtual private network (VPN), the Internet, a wireless network such as an IEEE 802.11x network, an Ethernet-compatible network, or any other secure or non-secure communication configuration or system.

A database 112, which may be a third-party database, may be configured to contain, for example, information such as the LIBOR rate or other information useful in determining market values of derivative products. The database 112 may be connected through the network 110 to the computer system 102. Similarly, one or more computing devices 114 such as, for example, a laptop computer, a handheld computing device, or any other mobile computing device may be connected through the network 110 to the computer system 102. In one embodiment, a user of a computing device 114 can remotely communicate via the network 110 to computer system 102 which may be located or connected to a clearinghouse or exchange. A user may remotely enter orders for agreements offered by the exchange and indicate a bank account to pay margin requirements and receive cash flows from swaps.

Of course, numerous additional servers, computers, handheld devices, personal digital assistants, telephones and other devices may also be connected to exchange computer system 102. Moreover, one skilled in the art will appreciate that the topology shown in FIG. 1 is merely an example and that the components shown in FIG. 1 may be connected by numerous alternative topologies.

The clearinghouse which may store and/or control the computing system 102 may act as a third-party guarantor of an agreement for a derivative, such as an exchange traded or exchange listed derivative, between the two parties of the agreement. For example, the derivative may be a centrally cleared forward swap. At least one benefit of an exchange traded derivative, as opposed to the OTC type, is that the derivative is cleared and guaranteed by the clearinghouse. This may promise more interesting capital efficiencies for institutions that may cross-margin one derivative against another derivative.

I. Conversion of Swaps

In an embodiment, one or more existing swaps may be converted to a standardized forward swap. A clearing process may be initiated to determine positions with converted swaps and to process the cash flows resulting from the conversion. The clearing process may be initiated by, for example, the processing unit 104 operating within the computer system 102. Following the initial cash flow processing, the positions associated with converted swaps will be maintained and guaranteed by a central clearing party. As the IRS positions for all parties may be standardized, the floating rate reset and payment processing may be simpler and easier to manage because there is only one floating rate reset and cash flow calendar per currency. The International Swaps and Derivatives Association (ISDA) day-count conventions, affect of holidays and other cash flow and reset related parameters may also be pre-selected.

Customers with OTC spot swaps can choose to convert their OTC spot swaps to a centralized or standardized forward swaps such as those offered Chicago Mercantile Exchange Inc. (CME). Conversion from the OTC swap to a centralized or standardized forward swap may provide a number of benefits such as, but limited to, favorable asset treatment, netting, hedging/margining credits and better Basis Point Value (BPV)/Duration (the value of a 1 basis point change in yield) and duration matching to their balance sheets. Different methods may be utilized CME offers two methods for converting OTC spots swaps to forward swaps.

A. Accrued Interest Method—Agreed Floating Rate

Figure 2:
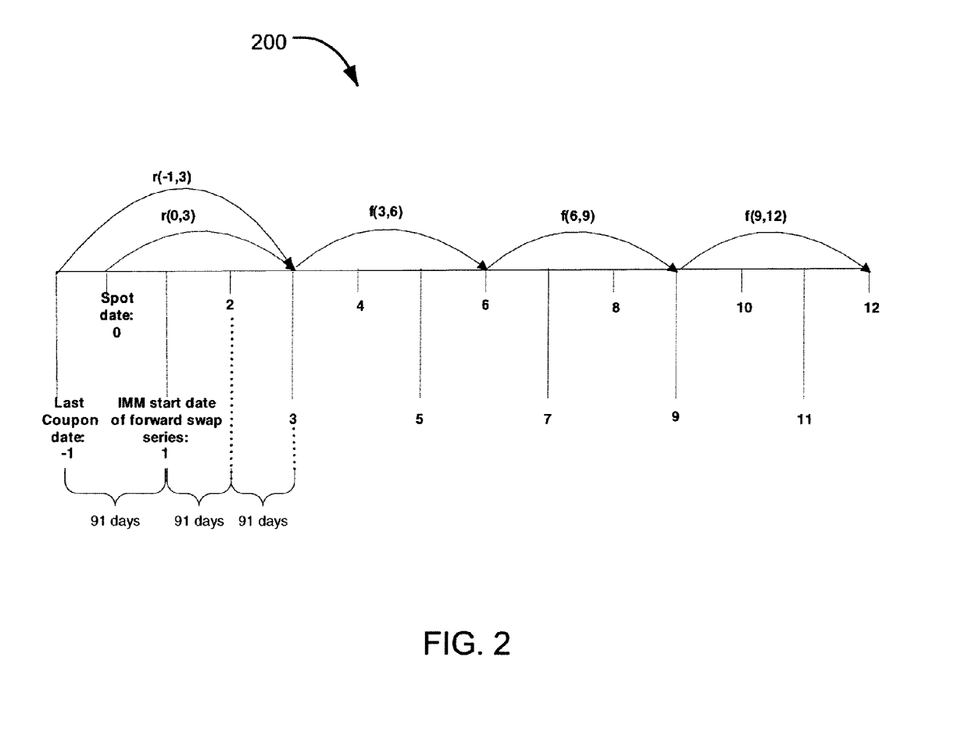
FIG. 2 illustrates an example of a conversion method implemented according to aspects of the disclosure.

FIG. 2 illustrates an example of an accrued interest method 200 that may be utilized to convert an OTC swap to a standardized swap by marking to market the OTC swap to the closest equivalent standardized swap. To determine the closest equivalent standardized swap for a specific OTC swap, a payout of the next coupon from the date the swap counterparties bring in their OTC swap for conversion must be determined. Upon completion of the conversion, both parties to the original OTC swap are exposed only to a series of forward rates. This is in contrast to the case when the parties had an OTC swap where they were exposed to a series of forward rates and a spot rate.

TABLE 1

| | |
|---|---|
| r | spot rate |
| f | forward rate |
| df | discount factor |
| dx | date on period x |
| r(0,3) | the spot rate that applies from period 0 until period 3 |
| f(3,6) | the forward rate that applies from period 3 until period 6 |
| df(0,3) | the discount factor that applies from period 0 until period 3 |

Table 1 provides a description and definition of the factors and variables related to the accrued interest method 200 illustrated in FIG. 2. In particular, these factors and variables are utilized as a part of computations and steps of the accrued interest method 200. The computations utilized to convert the OTC swap to a standardized forward swap include three difficulties that may need addressing: (1) if the OTC swap coupon dates are non-International Monetary Market (IMM) dates; (2) if the OTC swap payment frequency is not the same as that of the standardized swaps; and (3) If the spot rate (r(−1,3) in the Table 1 above, and illustrated in FIG. 2) for the OTC swap is not agreed upon or not determined by the counterparties.

For the sake of initially illustrating and discussing the method 200, it will be assumed that: (a) all OTC swap coupon dates are IMM dates; and (b) all OTC swap payment frequencies are the same as that of the standardized swaps. Returning to the example illustrated in FIG. 2, it may be assumed that the parties to the OTC swap have agreed or defined the floating rate. Thus, the rate (then r(−1,3) is known) then the payout may be calculated as follows:

$$\text{Payout of Spot Coupon} == [r(OTC \text{ fixed rate}) - r(-1, 3)] *$$
$$df(0, 3) * (d3 - d1)/360 *$$
$$\text{Notional Amount}$$
$$= [r(OTC \text{ fixed rate}) - r(-1, 3)] *$$

-continued $$SVF \text{ of 3 month standardized swap} * \text{Notional Amount}$$

Where, the SVF is the sum of the day count adjusted discount factors of the swap yield curve to a desired maturity. Additional details related to the SVF are discussed and described in the incorporated U.S. patent application Ser. No. 11/950,117, filed on Dec. 4, 2007, and titled "FACTORIZATION OF INTEREST RATE SWAP VARIATION".

B. Accrued Interest Method—Implied Floating Rate

There may be occasions where the rate may not be known or determined. For example, the parties may not agree to a rate. The rate may be estimated or calculated by: (i) determining the spot rate read from LIBOR/EURIBOR fixings on the spot date (0 in FIG. 2)(corresponding to zero (0) to three (3) month rate r(0,3) illustrated in FIG. 2); (ii) Determining the spot rate read from LIBOR/EURIBOR fixings on the last coupon date (−1 in diagram above) (corresponding to the rate r(−1,0) illustrated in FIG. 2); (iii) The rates determined in (i) and (ii) may be combined to imply a more up-to-date rate from period identified between −1 to 3 in FIG. 2 utilizing the formula:

$$r_{-1,3} = \left[\left(1 + r_{-1,0} * \left(\frac{d_0 - d_{-1}}{360}\right)\right) * \left(1 + r_{0,3} * \left(\frac{d_3 - d_0}{360}\right)\right) - 1\right] * \frac{360}{(d_3 - d_{-1})}$$

The formula may be utilized to determine or estimate the rate r(−1,3) based on the known interest rates at r(−1) and r(0,3). Thus, the rate r(−1,3) may be implied to determine the forward interest rate.

The determined or estimated rate r(−1,3) may, in turn, be utilized to determine the payout:

$$\text{Payout of Spot Coupon} = [r(OTC \text{ fixed rate}) - r(-1, 3)] *$$
$$df(0, 3) * (d3 - d1)/360 *$$
$$\text{Notional Amount}$$
$$= [r(OTC \text{ fixed rate}) - r(-1, 3)] *$$
$$SVF \text{ of 3 month standardized swap} *$$
$$\text{Notional Amount}$$

Once this payout is made, the mark-to-market (MTM) on the remaining part of the OTC swap with the standardized swap may be determined. Basically, at this point, the method 200 involves marking to market the series of expected forward rates of the OTC swap to the series of expected forward rates of the standardized swap. The marking to market process of the method 200 may be determined as:

$$\text{Payout of Remaining Expected Series} ==$$
$$\text{Market Value of Remaining } OTC \text{ Fixed Leg} -$$
$$MV \text{ of standardized swap fixed leg}$$

Applying the marking to market process to the example illustrated in FIG. 2 yields:

$$\text{Market Value of the standardized Swap Fixed Leg} =$$
$$(df(0, 9) - df(0, 3)) * \text{Notional}$$
$$\text{Market Value of Remaining } OTC \text{ Fixed Leg} ==$$
$$r(OTC \text{ fixed rate}) * [df(0, 6) * (d6 - d3)/360 +$$
$$df(0, 9) * (d9 - d6)/360] * \text{Notional}$$
$$\text{Total Market to Market Payout} ==$$
$$\text{Payout of Spot Coupon} + \text{Payout of Remaining Expected Series} =$$

$$\left(r_{-n,9}^{fixed} - r_{-1,3}\right) * df_{0,3} * \left(\frac{d_3 - d_1}{360}\right) +$$
$$r_{-n,9}^{fixed}\left[df_{0,6} * \left(\frac{d_6 - d_3}{360}\right) + df_{0,9} * \left(\frac{d_9 - d_6}{360}\right)\right] - [df_{0,3} - df_{0,9}] =$$
$$r_{-n,9}^{fixed}\left[df_{0,3} * \left(\frac{d_3 - d_1}{360}\right) + df_{0,6} * \left(\frac{d_6 - d_3}{360}\right) + df_{0,9} *$$
$$\left(\frac{d_9 - d_6}{360}\right)\right] - \left[r_{-1,3} * df_{0,3} * \left(\frac{d_3 - d_6}{360}\right)\right] - [df_{0,3} - df_{0,9}] =$$
$$MarketValueofOTCfixedleg - MV \text{ of } AccruedFloatingCoupon-$$
$$MV \text{ of } ForwardFixedorFloatingLeg$$

Figure 3:
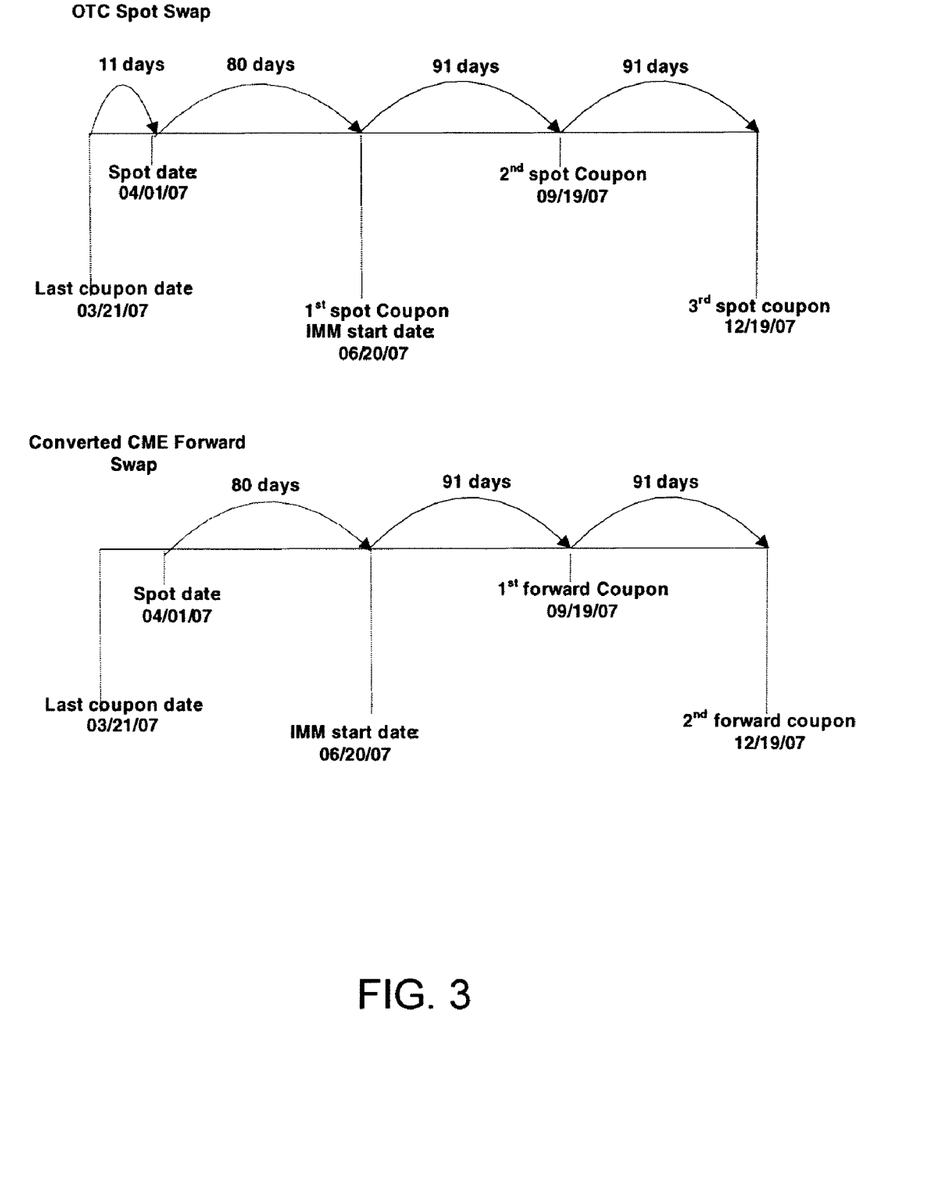
FIG. 3 illustrates another example of a conversion method implemented according to aspects of the disclosure.
Figure 4:
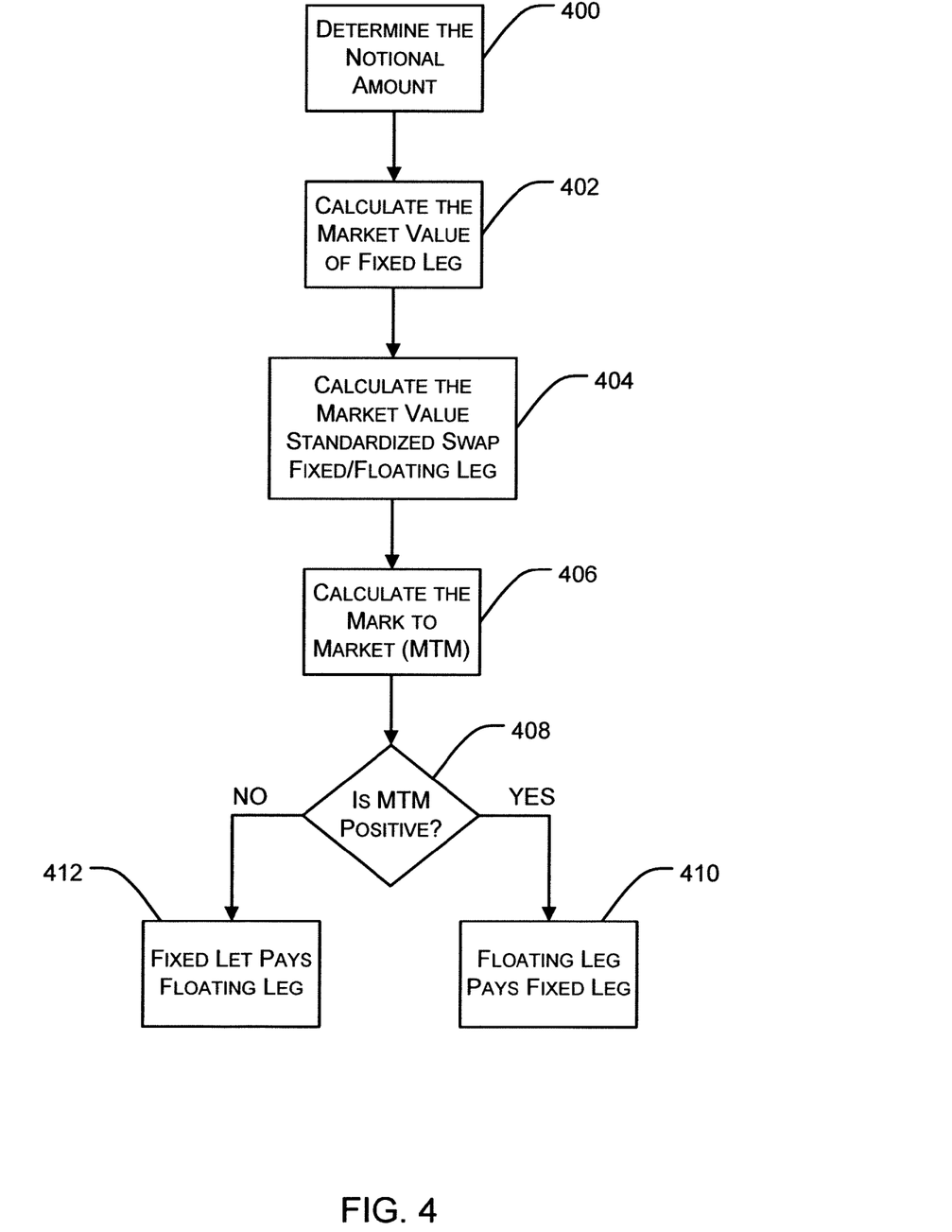
FIG. 4 illustrates a flowchart detailing an algorithm that may be implemented according to aspects of the disclosure.

FIGS. 3 and 4 illustrate another example of the accrued interest method 200 illustrated in FIG. 2. In particular, the exemplary method 300 of FIG. 3 is discussed in detail and illustrated in the flowchart of FIG. 4.

At block 400, the exemplary method 300 may be initiated by determining the notional/cash value of the coupon to be received on the IMM start date (e.g., Jun. 20, 2007) and discounting that amount back to the spot date. As previously discussed and shown above, the cash flow may be determined as the difference between the OTC spot swap fixed rate and the floating rate applied from the last coupon date (e.g., Mar. 21, 2007) to the next spot coupon IMM date (e.g., Jun. 20, 2007). If the floating rate is agreed upon by the parties then the cash flow can be easily determined and discounted. If not then floating rate from last coupon date to IMM start date may be implied.

At block 402, the market value of the fixed leg for payments made on Sep. 19, 2007 and Dec. 19, 2007 per the agreed upon fixed rate discounted back to the spot date (e.g., Apr. 1, 2007) may be calculated.

At block 404, the market value of the desired standardized fixed or floating leg covering the forward rates from Jun. 20, 2007 to Sep. 19, 2007 and from Sep. 19, 2007 to Dec. 19, 2007 discounted back to today may be calculated.

At block 406, the market value of the coupon (step 400) may be combined with the market value of the remaining coupons on the fixed leg (step 402) and the total of these two market values may be subtracted from the market value of the desired floating leg (Standardized Forward Swap floating leg) (step 404). The resulting product of this combination represent the Mark to Market (MTM) necessary for converting this OTC spot swap to an equivalent standardized forward swap.

At block 408 the MTM product may be evaluated. If the total MTM is positive, the OTC fixed leg has a greater market value than the fixed leg of the desired standardized forward swap (plus the additional OTC spot accrued floating coupon) and then at block 410, the floating leg holder must pay the fixed leg holder that amount to induce them to convert. However, if the total MTM is negative, the OTC fixed leg has a lower market value than the fixed leg of the desired Standardized Forward Swap (plus the additional OTC spot accrued floating coupon) and then, at block 412 the fixed leg holder must pay the floating leg holder that amount to induce them to convert.

C. Forward Conversion Method

The forward conversion method builds on the accrued interest method 200 disclosed and discussed above. The forward conversion method converts an OTC swap with a certain maturity to a standardized swap with a different maturity than that of the OTC swap.

Initially the forward conversion method determines the payout of the spot coupon per the accrued interest method 200 discussed above. The forward conversion method is generally an attempt to quantify the increased risk in the first MTM collection made. After the risk is quantified, the MTM process adjusts the fixed rate from "yesterday" to "today's" settlement rate for the same maturity standardized swap. To quantify the risk: (1) a reasonable approximation to the closest/most comparable instrument may be made, and the approximation may be collected through the MTM process; or (2) the duration and convexity costs may be directly calculated and then added to the coupon that was determined for the parties.

The accrued interest method 200 suggests that all the forward rates for the OTC and standardized swap are aligned with each other including the last forward rate of the original OTC swap matches the last forward rate of the standardized swap. This is a simplifying assumption that can be broken and the MTM differences be calculated using the methods shown below. The matching relationship is not necessarily the case when the parties attempt to trade or convert their original OTC swaps for a new, longer maturity standardized swap.

In one embodiment, the remaining portion of the OTC swap may be evaluated after the payout is determined. Returning to the example shown in FIG. 2, after the payout the fixed leg of OTC swap looks as follows:

$$r_{-n,9}^{fixed}\left[df_{0,6} * \left(\frac{d_6 - d_3}{360}\right) + df_{0,9} * \left(\frac{d_9 - d_6}{360}\right)\right]$$

If, for example, it was desirable to covert the OTC swap maturing in period 9 to a standardized swap maturing in period 12. Thus the fixed leg of the Standardized swap looks like:

$$r_{3,12}^{fixed}\left[df_{3,6} * \left(\frac{d_6 - d_3}{360}\right) + df_{3,9} * \left(\frac{d_9 - d_6}{360}\right) + df_{3,12} * \left(\frac{d_{12} - d_9}{360}\right)\right]$$

In this example, the fixed leg equals the floating leg of the standardized swap which looks like:

$$= f_{3,6} * df_{3,6} * \left(\frac{d_6 - d_3}{360}\right) +$$

$$f_{6,9} * df_{3,9} * \left(\frac{d_9 - d_6}{360}\right) + f_{9,12} * df_{3,12} * \left(\frac{d_{12} - d_9}{360}\right)$$

Thus the OTC swap leg covers the floating rate series up to period 9, whereas the standardized swap covers the floating rate series up to period 12, i.e., up to period 9 plus the floating rate from period 9 to 12 as illustrated by the following (note all the discount factors below are LIBOR/EURIBOR discount factors not standardized swap discount factors as used above):

$$f_{9,12} * \left(\frac{d_{12} - d_9}{360}\right)$$

Discounting this back to the swap start date of period 3 provides:

$$f_{9,12} * \left(\frac{d_{12} - d_9}{360}\right) * df_{3,12}$$

Discount this back to a present day, being period 0 provides:

$$f_{9,12} * \left(\frac{d_{12} - d_9}{360}\right) * df_{3,12} * df_{0,3} = f_{9,12} * \left(\frac{d_{12} - d_9}{360}\right) * df_{0,12}^{Libor/Euribor}$$

Thus, to get a comparable OTC swap to the standardized swap an extra coupon is added to the OTC swap to construct a theoretical equivalent of the standardized swap. The floating rate from period 9 to 12 $f_{9,12}$ may be read from the LIBOR/EURIBOR fixing curve read on day 0 where $f_{9,12}$ the implied forward is $$\frac{df_{0,12}}{df_{0,9}} = $$

$$df_{9,12} = \frac{1}{\left(1 + f_{9,12} * \left(\frac{d_{12} - d_9}{360}\right)\right)} => f_{9,12} = \left(\frac{df_{0,9}}{df_{0,12}} - 1\right) * \frac{360}{(d_{12} - d_9)}$$

Thus, the following may be added to the remaining OTC swap Fixed Leg:

$$f_{9,12} * \left(\frac{d_{12} - d_9}{360}\right) * df_{0,12}^{Libor/Euribor}$$

Market Value of Remaining Comparable *OTC* swap Fixed Leg =

$$r_{-n,9}^{fixed}\left[df_{0,6} * \left(\frac{d_6 - d_3}{360}\right) + df_{0,9} * \left(\frac{d_9 - d_6}{360}\right)\right] +$$

$$f_{9,12} * \left(\frac{d_{12} - d_9}{360}\right) * df_{0,12}^{Libor/Euribor}$$

Market Value of Standardized swap Fixed Leg =

$$r_{3,12}^{fixed}\left[df_{0,6} * \left(\frac{d_6 - d_3}{360}\right) + df_{0,9} * \left(\frac{d_9 - d_6}{360}\right) + df_{0,12} * \left(\frac{d_{12} - d_9}{360}\right)\right] = $$

$$f_{3,6} * df_{0,6} * \left(\frac{d_6 - d_3}{360}\right) + f_{6,9} * df_{0,9} * \left(\frac{d_9 - d_6}{360}\right) + $$

$$f_{9,12} * df_{0,12} * \left(\frac{d_{12} - d_9}{360}\right) = [df_{0,3} - df_{0,12}]$$

Payout of Remaining Expected Series ==

Market Value of Remaining *OTC* Fixed Leg –

MV of Standardized swap Fixed Leg =

-continued $$r_{-n,9}^{fixed}\left[df_{0,6}*\left(\frac{d_6-d_3}{360}\right)+df_{0,9}*\left(\frac{d_9-d_6}{360}\right)\right]+$$

$$f_{9,12}*\left(\frac{d_{12}-d_9}{360}\right)*df_{0,12}^{Libor/Euribor}-[df_{0,3}-df_{0,12}]$$

Total Market to Market Payout ==

Payout of Spot Coupon + Payout of Remaining Expected Series $$\left(r_{-n,9}^{fixed}-r_{-1,3}\right)*df_{0,3}*\left(\frac{d_3-d_1}{360}\right)+$$

$$r_{-n,9}^{fixed}\left[df_{0,6}*\left(\frac{d_6-d_3}{360}\right)+df_{0,9}*\left(\frac{d_9-d_6}{360}\right)\right]+$$

$$f_{9,12}*\left(\frac{d_{12}-d_9}{360}\right)*df_{0,12}^{Libor/Euribor}-[df_{0,3}-df_{0,12}]$$

In another embodiment, the payout of the remaining expected series by valuing the market value of the remaining OTC Fixed Leg may be approximated as follows:

One way to quantify the convexity and duration risk associated with switching from an OTC swap to a standardized swap is two track the duration and convexity of the swap. The duration and convexity of the fixed leg of the standardized swap may be computed using the following Taylor series approximation of the change in market value:

--- dp/p = −D*dy + ½ * C * dy^2 where:

dy = change in the yield to maturity (YTM) of the fixed leg (from OTC fixed leg YTM to CME fixed leg YTM)
D = modified duration of fixed leg of OTC swap
C = convexity of fixed leg of OTC swap
P = Price of fixed leg of OTC swap
dp = expected change in market value on fixed leg of OTC swap given the change in yield to maturity.

---

Market Value of Remaining Comparable OTC swap Fixed Leg ==

$$r_{-n,9}^{fixed}\left[df_{0,6}*\left(\frac{d_6-d_3}{360}\right)+df_{0,9}*\left(\frac{d_9-d_6}{360}\right)\right]+dp$$

Payout of Remaining Expected Series ==

Market Value of Remaining OTC Fixed Leg −

MV of Standardized swap Fixed Leg =

$$r_{-n,9}^{fixed}\left[df_{0,6}*\left(\frac{d_6-d_3}{360}\right)+df_{0,9}*\left(\frac{d_9-d_6}{360}\right)\right]+dp-[df_{0,3}-df_{0,12}]$$

Total Market to Market Payout ==

Payout of Spot Coupon + Payout of Remaining Expected Series $$\left(r_{-n,9}^{fixed}-r_{-1,3}\right)*df_{0,3}*\left(\frac{d_3-d_1}{360}\right)+$$

$$r_{-n,9}^{fixed}\left[df_{0,6}*\left(\frac{d_6-d_3}{360}\right)+df_{0,9}*\left(\frac{d_9-d_6}{360}\right)\right]+dp-[df_{0,3}-df_{0,12}]$$

D. Non-IMM Based Swaps

Non-IMM dated swaps can also be converted via the above methods. For example, a non-IMM dated swap with the payment frequency the same as the standardized swaps' payment frequencies can be converted by shifting the OTC swap coupon payments present value to the present value of the coupon payments had they occurred on an IMM date. One way of doing this is as follows:

Non-IMM Dated OTC swap:

$$r_{-n,9.5}^{fixed}\left[df_{0,3.5}*\left(\frac{d_{3.5}-d_{1.5}}{360}\right)+df_{0,6.5}*\left(\frac{d_{6.5}-d_{3.5}}{360}\right)+\right.$$

$$\left.df_{0,9.5}*\left(\frac{d_{9.5}-d_{6.5}}{360}\right)\right]<>r_{-1.5,3.5}*df_{0,3.5}*\left(\frac{d_{3.5}-d_{1.5}}{360}\right)+$$

$$f_{3.5,6.5}*df_{0,6.5}*\left(\frac{d_{6.5}-d_{3.5}}{360}\right)+f_{6.5,9.5}*df_{0,9.5}*\left(\frac{d_{9.5}-d_{6.5}}{360}\right)$$

Payout of Spot Coupon = $\left(r_{-n,9.5}^{fixed}-r_{-1.5,3.5}\right)*df_{0,3.5}*\left(\frac{d_{3.5}-d_{1.5}}{360}\right)$ Remaining Expected Series of non-IMM Dated OTC swap =

$$r_{-n,9.5}^{fixed}\left[df_{0,6.5}*\left(\frac{d_{6.5}-d_{3.5}}{360}\right)+df_{0,9.5}*\left(\frac{d_{9.5}-d_{6.5}}{360}\right)\right]<>f_{3.5,6.5}*df_{0,6.5}*$$

$$\left(\frac{d_{6.5}-d_{3.5}}{360}\right)+f_{6.5,9.5}*df_{0,9.5}*\left(\frac{d_{9.5}-d_{6.5}}{360}\right)=df_{0,3.5}-df_{0,9.5}$$

Desired standardized swap:

$$r_{-n,9}^{fixed}\left[df_{0,6}*\left(\frac{d_6-d_3}{360}\right)+df_{0,9}*\left(\frac{d_9-d_6}{360}\right)\right]=$$

$$f_{3,6}*df_{0,6}*\left(\frac{d_6-d_3}{360}\right)+f_{6,9}*df_{0,9}*\left(\frac{d_9-d_6}{360}\right)=df_{0,3}-df_{0,9}$$

Payout of Remaining Expected Series to non-aligned dates =

$$r_{-n,9.5}^{fixed}\left[df_{0,6.5}*\left(\frac{d_{6.5}-d_{3.5}}{360}\right)+df_{0,9.5}*\left(\frac{d_{9.5}-d_{6.5}}{360}\right)\right]-[df_{0,3.5}-df_{0,9.5}]$$

This MTM means that the fixed and floating legs of the OTC swap are equal.

Payout of Remaining Expected Series to aligned dates=

[df$_{0,3.5}$−df$_{0,9.5}$]+dp−[df$_{0,3}$−df$_{0,9}$]

Where dp is the market value differential due to duration and convexity bias of the OTC fixed leg to the CME fixed leg.

dp/p=−D*dy+½*C*dy^2 dp is estimated per method 2 above.

Total Market to Market Payout =

Payout of Spot Coupon + Payout of Remaining Expected Series =

Payout of Spot Coupon +

Payout of Remaining Expected Series to non-aligned dates +

Payout of Remaining Expected Seriesto aligned dates =

$$\left(r_{-n,9.5}^{fixed}-r_{-1.5,3.5}\right)*df_{0,3.5}*\left(\frac{d_{3.5}-d_{1.5}}{360}\right)+$$

$$r_{-n,9.5}^{fixed}\left[df_{0,6.5}*\left(\frac{d_{6.5}-d_{3.5}}{360}\right)+df_{0,9.5}*\left(\frac{d_{9.5}-d_{6.5}}{360}\right)\right]-[df_{0,3.5}-$$

$$df_{0,9.5}]+[df_{0,3.5}-df_{0,9.5}]+dp-[df_{0,3}-df_{0,9}]=$$

$$\left(r_{-n,9.5}^{fixed}-r_{-1.5,3.5}\right)*df_{0,3.5}*\left(\frac{d_{3.5}-d_{1.5}}{360}\right)+$$

$$r_{-n,9.5}^{fixed}\left[df_{0,6.5}*\left(\frac{d_{6.5}-d_{3.5}}{360}\right)+df_{0,9.5}*\left(\frac{d_{9.5}-d_{6.5}}{360}\right)\right]+$$

$$dp-[df_{0,3}-df_{0,9}]$$

E. Non-Aligned Coupon Dates

Non-aligned coupon dated swaps can also be converted via the above methods. A non-aligned coupon dated swap can be performed similar to the non-IMM dated case. One way is to first strip out the first coupon and pay it out. The dp may be calculated in relation to the fixed leg and added to the market value of the remaining expected series. Finally, the resulting product may, in turn, be added to the first coupon payout and subtract the net from the market value of the desired standardized swap floating leg. An example of this is shown below:

Total Market to Market Payout
=Payout of Spot Coupon+Payout of Remaining Expected Series $$= \left(r^{fixed}_{-n,16.5} - r_{-1,6.5}\right) * d f_{0,6.5} * \left(\frac{d_{6.5} - d_{1.5}}{360}\right) +$$

$$r^{fixed}_{-n,16.5}\left[d f_{0,9.5} * \left(\frac{d_{9.5} - d_{6.5}}{360}\right) + d f_{0,16.5} * \left(\frac{d_{16.5} - d_{9.5}}{360}\right)\right] +$$

$$d p - [d f_{0,3} - d f_{0,16}]$$

Where dp is the market value differential due to duration and convexity bias of the OTC fixed leg to the CME fixed leg.

| $dp/p = -D * dy + \frac{1}{2} * C * dy^2$ |
| --- |
| where: |

| | |
| --- | --- |
| dy = | change in the yield to maturity (YTM) of the fixed leg (from OTC fixed leg YTM to CME fixed leg YTM) |
| D = | modified duration of fixed leg of OTC swap |
| C = | convexity of fixed leg of OTC swap |
| P = | Price of fixed leg of OTC swap |
| dp = | expected change in market value on fixed leg of OTC swap given the change in yield to maturity. |

F. Overriding the Standardized Swap Curve with Other Curves

The standardized swap curve can be overridden in favor of any other swap curve. The adjustments necessary would simply involve recalculating the Swap Value Factor using the rates from the new curve. The swap value factor is the sum of the discount factors implied from the swap curve, so in case of using a new curve the new SVF is:

$$NewSVF = \left[d f_{0,3} * \left(\frac{d_3 - d_1}{360}\right) + d f_{0,6} * \left(\frac{d_6 - d_3}{360}\right) + d f_{0,9} * \left(\frac{d_9 - d_6}{360}\right)\right]$$

where the discount factors (df's) come from the new swap curve.

Clients can have several methods of implying a "more accurate" swap curve with "more accurate" rates that imply interest rate, liquidity and basis risks "better". Several of these methods are itemized below; however clients may have different proprietary algorithms of deriving those swap yield curves. As mentioned above, regardless of the method, if clients agree to use their own swap curves, all the methods shown above hold true. The difference is that a new SVF needs to be calculated as shown in the equation above. This new SVF would have to use the discount factors calculated from the rates which the clients send us from their swap yield curve.

The common methods clients may use to build their swap yield curves are: Term structure methods, such as Hull-White, Vasicek, Black-Derman Toy (BDT) etc. These methods are divided into:

Short rate models which attempt to predict what the continuously compounding short rate (the rate over an infinitesimally small period of time starting from today and maturing at an infinitesimally small period of time from today). The models rely on attempting to calibrate to the real market price of risk based on today's spot yield curve and then accounting for one or several factors, hence the models are considered one, two or three factor models, depending on how many factors are used. The factors can be: (a) short interest rates; (b) stochastic volatility; (c) stochastic means; and (d) stochastic mean reversion parameters. In addition instead of simply assuming that the short rates move according to a stochastic process, certain models such as BDT assume that there are only two possible realizations of the short rates either up (increasing) or down (decreasing). These models build a binomial tree of all the possible interest rates, a.k.a. a lattice, and then will uses those rates to imply the term structure. Other models can build trinomial trees of the short rates, up, down or flat (no change).

Forward rate models which instead of assuming that the short rates move according to a stochastic process, these models assume that the forward rates will move according to a stochastic process. An example of such a model is Heath-Jarrow-Morton model (HJM).

Principal Component Analysis which instead of modeling the short/forward rates these models look at the level, slope and curvature of the yield curve and attempt to imply the best possible combination to provide the most accurate rates.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

What is claimed is:

1. A computer-implemented method of converting an over-the-counter swap associated with a fixed rate and a floating rate to a forward swap, the method comprising:
   determining, by a processor, a spot rate estimate between a spot rate associated with an over-the-counter swap and a spot rate associated with a forward swap;
   determining, by the processor, a spot payout based on the spot rate estimate and a notional amount;
   calculating, by the processor, a market value associated with the over-the-counter swap payments;
   calculating, by the processor, a market value based on the spot rate estimate;
   calculating, by the processor, a market value based on a fixed rate; and
   determining, by the processor, a cash flow difference between the market value based on the spot rate estimate and the market value based on a fixed rate.

2. The method of claim 1, wherein determining the spot rate estimate is based on an agreed upon rate.

3. The method of claim 1, wherein determining the spot rate estimate includes estimating the spot rate estimate based on two or more known spot rates.

4. The method of claim 3, wherein estimating the spot rate includes estimating the swap rate based on a swap rate curve.

5. The method of claim 1, wherein the over-the-counter swap has a first maturity and the forward swap has a second maturity different from the first maturity.

6. The method of claim 1, wherein the over-the-counter swap and the forward swap are both International Monetary Market dated swaps.

7. A computer-implemented method of converting an over-the-counter swap having a fixed rate leg and a floating rate leg to a forward swap, the method comprising:

(a) determining, by a processor, a notional value of a coupon to be received on an agreed-upon start date for an over-the-counter swap and discounting the notional value of the coupon to a spot date;

(b) determining, by the processor, a cash flow as a difference between the fixed rate leg and the floating rate leg applied from a last coupon date to the next spot coupon agreed-upon date;

(c) calculating, by the processor, a market value of the fixed leg for payments;

(d) calculating, by the processor, the market value of a desired forward fixed or floating leg discounted back to today; and (e) calculating, by the processor, a mark-to-market for converting this over-the-counter spot swap to an equivalent a forward swap according to the market value of the coupon determined in (a) the market value of the remaining coupons on the fixed leg in (c) and the market value of the desired floating leg (d).

8. The method of claim 7, wherein determining the cash flow is based on an agreed upon rate floating rate.

9. The method of claim 7, wherein determining the cash flow includes estimating a spot rate based on two or more known spot rates.

10. The method of claim 9, wherein estimating the spot rate includes estimating the swap rate based on a swap rate curve.

11. The method of claim 7, wherein the over-the-counter swap has a first maturity and the forward swap has a second maturity different from the first maturity.

12. The method of claim 7, wherein the agreed-upon start date is an International Monetary Market start date.

13. A computer-implemented method of converting an over-the-counter swap having a first leg and a second leg to a forward swap, the method comprising:

determining, by a processor, a payout to be received on a start date of an over-the-counter swap and discounting the payout to a spot date;

determining, by the processor, a cash flow as a difference between the first leg and the second leg applied from a last payout date to the next payout date;

calculating, by the processor, a market value of the first leg;

calculating, by the processor, a market value of a forward swap having a first and second legs, wherein the first and second legs are discounted to the start date; and calculating, by the processor, a mark-to-market for converting the over-the-counter spot swap to the forward swap as a function of the payout, the market value of the first leg and the market value of the second leg associated with the forward swap.

14. The method of claim 13, wherein determining the cash flow is based on an agreed upon rate floating rate.

15. The method of claim 13, wherein determining the cash flow includes estimating a spot rate based on two or more known spot rates.

16. The method of claim 15, wherein estimating the spot rate includes estimating the swap rate based on a swap rate curve.

17. The method of claim 13, wherein the over-the-counter swap has a first maturity and the forward swap has a second maturity different from the first maturity.

18. The method of claim 13, wherein the agreed-upon start date is an International Monetary Market start date.

* * * * *

UNITED STATES PATENT AND TRADEMARK OFFICE
CERTIFICATE OF CORRECTION

| | | |
|---|---|---|
| PATENT NO. | : 8,117,110 B2 | |
| APPLICATION NO. | : 11/965530 | |
| DATED | : February 14, 2012 | |
| INVENTOR(S) | : Hadi et al. | |

It is certified that error appears in the above-identified patent and that said Letters Patent is hereby corrected as shown below:

<u>In the Claims</u>

In column 13, claim 7, line 7, after "a last coupon date to" replace "the" with --a--.

In column 13, claim 7, line 16, before "forward swap according to the market" delete "a".

Signed and Sealed this
Eighth Day of May, 2012

David J. Kappos
*Director of the United States Patent and Trademark Office*